United States Patent
Nagendra et al.

(10) Patent No.: US 12,530,550 B2
(45) Date of Patent: Jan. 20, 2026

(54) RFID ANTENNA SYSTEM

(71) Applicant: Sato Holdings Kabushiki Kaisha, Tokyo (JP)

(72) Inventors: Ganesh Nagendra, St Peters (AU); Tai Wai Pong, St Peters (AU)

(73) Assignee: SATO CORPORATION, Tokyo (JP)

( * ) Notice: Subject to any disclaimer, the term of this patent is extended or adjusted under 35 U.S.C. 154(b) by 39 days.

(21) Appl. No.: 18/685,044

(22) PCT Filed: Aug. 20, 2021

(86) PCT No.: PCT/IB2021/057660
§ 371 (c)(1),
(2) Date: Feb. 20, 2024

(87) PCT Pub. No.: WO2023/021320
PCT Pub. Date: Feb. 23, 2023

(65) Prior Publication Data
US 2025/0131216 A1 Apr. 24, 2025

(51) Int. Cl.
*G06K 7/10* (2006.01)
(52) U.S. Cl.
CPC ..... *G06K 7/10356* (2013.01); *G06K 7/10227* (2013.01); *G06K 7/10415* (2013.01)
(58) Field of Classification Search
CPC ........... G06K 7/10356; G06K 7/10227; G06K 7/10415
USPC ................................................ 340/10.1, 10.5
See application file for complete search history.

(56) References Cited

U.S. PATENT DOCUMENTS

| | | | | |
|---|---|---|---|---|
| 7,124,943 | B2* | 10/2006 | Quan | G06F 8/65 340/10.1 |
| 7,973,645 | B1* | 7/2011 | Moretti | G06K 7/10356 340/572.2 |
| 8,558,669 | B2* | 10/2013 | Man | G06K 7/10356 340/572.1 |
| 8,742,975 | B2* | 6/2014 | Gravelle | G01S 13/751 342/42 |
| 8,937,532 | B2* | 1/2015 | Hinman | G06K 19/07327 340/568.1 |
| 9,064,164 | B2* | 6/2015 | Jett | H04L 12/189 |
| 2018/0189053 | A1* | 7/2018 | Na | H04L 41/08 |
| 2020/0161742 | A1 | 5/2020 | Leitermann et al. | |

OTHER PUBLICATIONS

International Search Report dated Dec. 5, 2022, issued in counterpart International Application No. PCT/IB2021/057660. (2 pages).

* cited by examiner

*Primary Examiner* — Nam V Nguyen
(74) *Attorney, Agent, or Firm* — WHDA, LLP

(57) ABSTRACT

A radio frequency identification (RFID) antenna system (100) is adapted to receive and implement firmware programming from an RFID reader. The RFID antenna system comprises a plurality of antenna coils (104) for reading RFID tags, a selection circuit (106) configured to activate an active antenna coil from the plurality of antenna coils (104), and a processor (108) configured to control operation of the selection circuit (106). The RFID antenna system also includes a data transceiver (110) configured to provide bidirectional data communication between the processor (108) and the RFID reader so that the RFID antenna system (100) receives and implements firmware programming from the RFID reader.

4 Claims, 6 Drawing Sheets

RFID ANTENNA SYSTEM

TECHNICAL FIELD

The present disclosure relates, generally, to a radio frequency identification (RFID) antennas and RFID readers. The disclosure has particular, but not necessarily exhaustive, application to an RFID antenna system adapted to receive and implement firmware programming from an RFID reader.

BACKGROUND

Radio frequency identification (RFID) systems typically include one or more antennas that can communicate with RFID transponders (or "tags"), as well as an RFID reader (or "interrogator") in communication with the one or more antennas. The antennas send radio frequency (RF) signals to the RFID tags and any response received from an RFID tag by the antenna(s) is relayed to the reader for further processing.

In RFID systems where multiple antennas are used, for example for inventory tracking in a large area or volume such as in warehouse shelving and the like, operation of the antennas is typically controlled by one or more readers that are in communication with the antennas. The antennas include a processor or controller (for example a microcontroller) that interprets control signals from the reader and effects operation of one antenna at a time per reader so that the RFID tags within range of that antenna are read and the relevant information sent to the reader.

In some applications of RFID systems, for example fridges used in medical facilities to stock blood, medication, etc., the RFID system comprises antenna shelves that form part of the fridge or cabinet. Items placed on each shelf are tagged, and the RFID tags can be read to identify the items by individually activating the one or more antennas associated with each shelf. The manner in which the RFID system activates and operates the antennas in the shelving is controlled based on a defined method implemented in firmware on the processor or controller that controls operation of the antennas. If this defined method is amended, the firmware needs to be changed or updated. However, because of the environment in which the RFID system is implemented, the antennas are sealed and watertight, and often inside a metal cavity such as a fridge.

Where an RFID antenna system and its associated controller are encased in a sealed and watertight enclosure, it is not practical to include a separate programming connector to the controller for the purpose of data communication with the controller from an external source (external to the RFID system enclosure, and in some instances also external to the application environment such as a cabinet or a fridge). Furthermore, where the application environment is a metal cavity, such as a fridge, wireless data communication such as via Wi-Fi is also not feasible. Therefore, the only solution is to remove the antenna system (for example in the form of an antenna shelf) from the cabinet or fridge, and break open the sealed enclosure to access the controller which is then removed, updated, and replaced, following which the antenna shelf must be resealed and replaced into the cabinet or fridge.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect there is provided a radio frequency identification (RFID) antenna system adapted to receive and implement firmware programming from an RFID reader, the RFID antenna system comprising: a plurality of antenna coils for reading RFID tags; a selection circuit configured to activate an active antenna coil from the plurality of antenna coils; a processor configured to control operation of the selection circuit; and a data transceiver configured to provide bidirectional data communication between the processor and the RFID reader so that the RFID antenna system receives and implements firmware programming from the RFID reader.

The data transceiver may comprise a communication module. The data transceiver may also comprise a pre-processing network and/or a codec. The communication module may comprise an RF module. The RF module may comprise a Pulse Jitter Modulation (PJM) RFID chip adapted to have: an analogue contact (AC) interface in communication with the RFID reader; and an input/output (IO) interface in communication with the processor.

The processor may be configured to: input a received signal from the RFID reader via the data transceiver; extract operating data from the received signal; and load firmware on the processor based on the extracted operating data.

In another aspect there is provided a method of updating firmware of an RFID system, the method comprising: receiving, at a data transceiver of an RFID antenna system, a signal from an RFID reader; extracting, at a processor of the RFID antenna system, operating data from the received signal; and updating firmware on the processor based on the extracted operating data.

BRIEF DESCRIPTION OF DRAWINGS

Non-limiting embodiments of the disclosure are now described by way of example only with reference to the accompanying drawings in which.

In the drawings, like reference numerals designate similar parts.

DESCRIPTION

Figure 1:
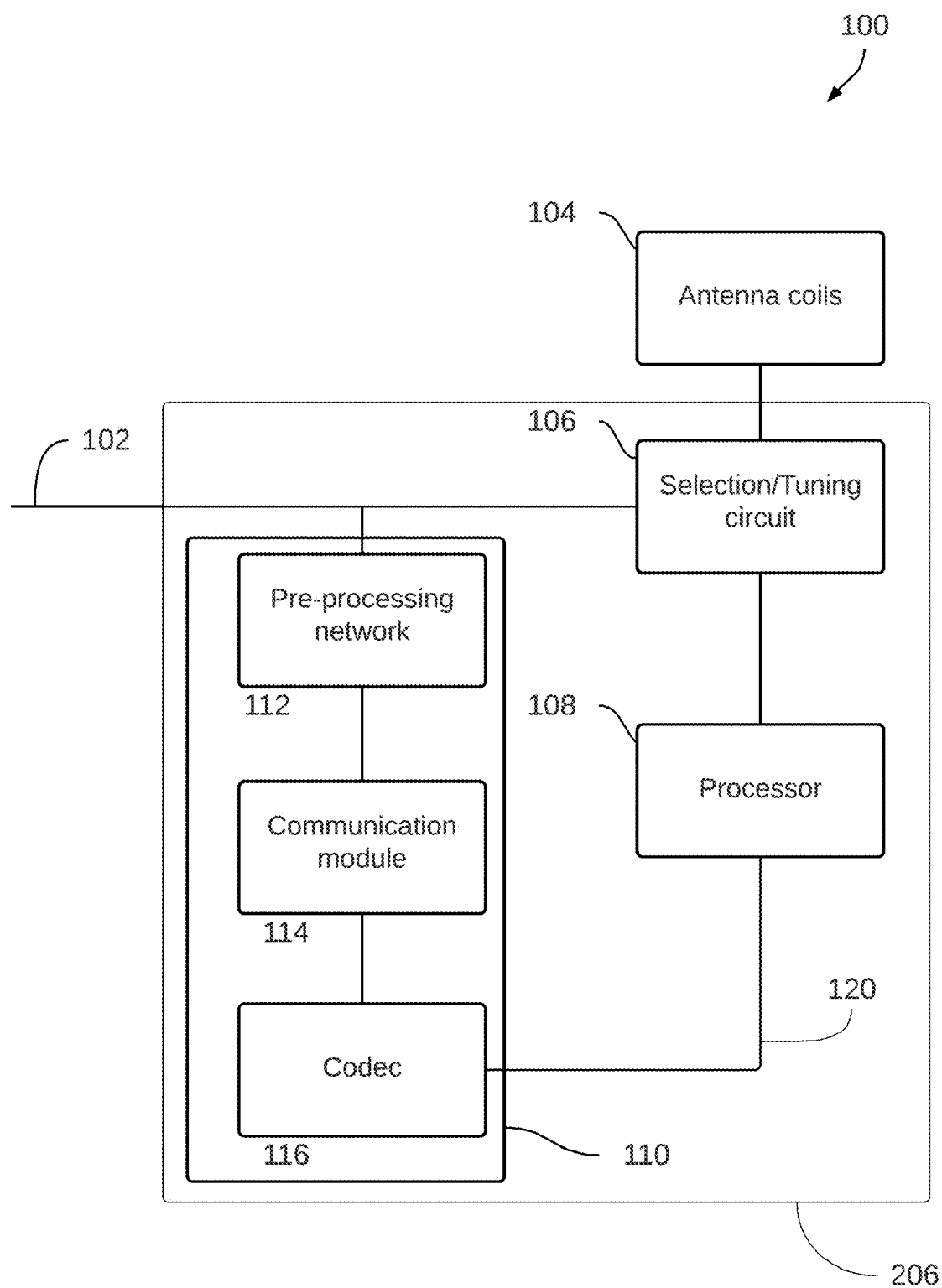
FIG. 1 is a schematic representation of an embodiment of an RFID antenna system.

Referring to FIG. 1 of the drawings, a radio frequency identification (RFID) antenna system 100 is shown that is adapted to receive and implement firmware programming from an RFID reader (not shown). The RFID antenna system has a plurality of antenna coils 104 for reading RFID tags.

The RFID antenna system also has a selection circuit 106 configured to activate an active antenna coil from the plurality of antenna coils 104, and a processor 108 configured to control operation of the selection circuit 106. The RFID antenna system has a data transceiver 110 configured to provide bidirectional data communication between the processor 108 and the RFID reader so that the RFID antenna system 100 receives firmware programming from the RFID reader and implement the received firmware programming. In one exemplary embodiment, the firmware programming is received from the RFID reader via a cable 102.

Figure 2:
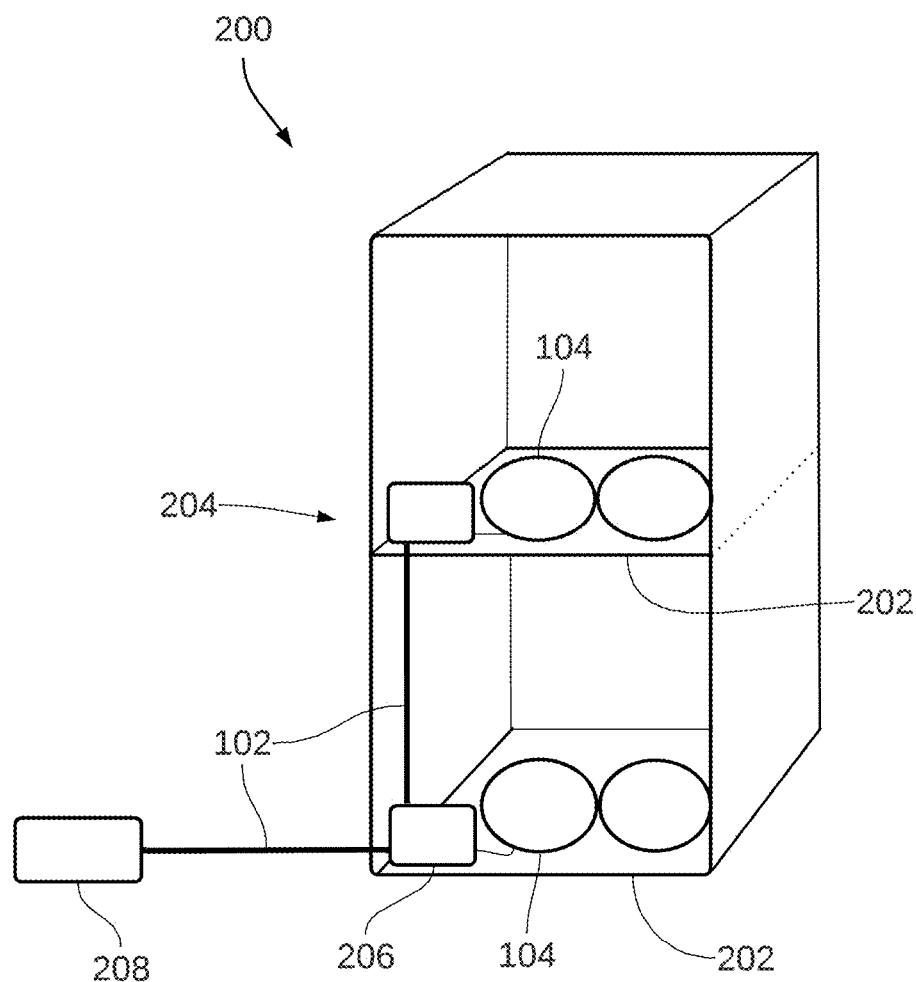
FIG. 2 shows an embodiment of a cabinet in which the RFID antenna system of FIG. 1 is used.
Figure 3A:
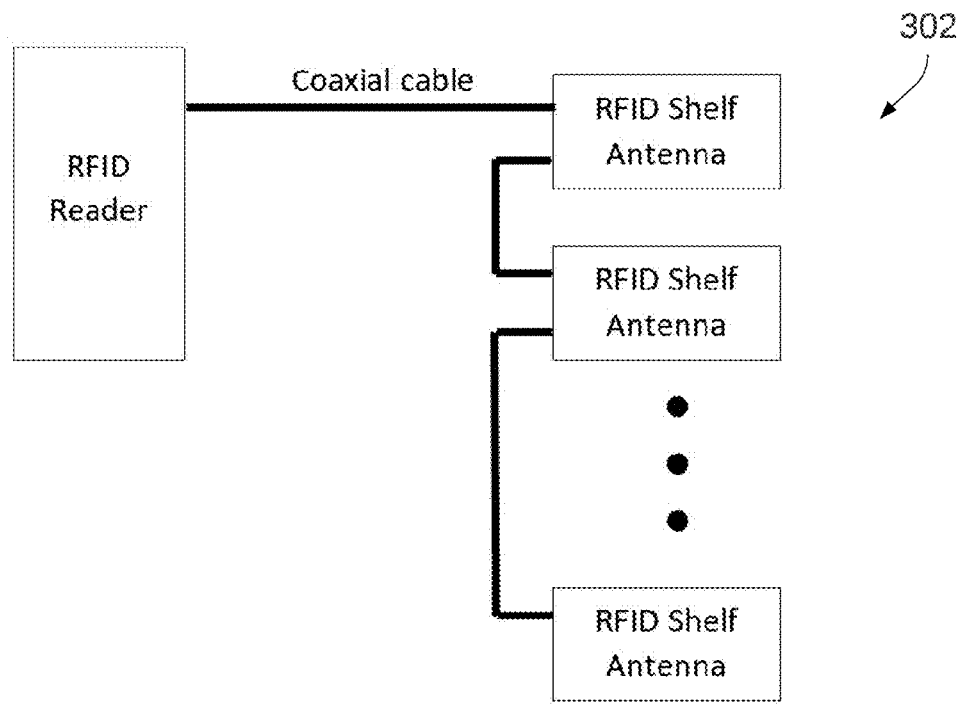
FIG. 3A illustrates an RFID reader and RFID shelf antennas in a daisy chain arrangement.
Figure 3B:
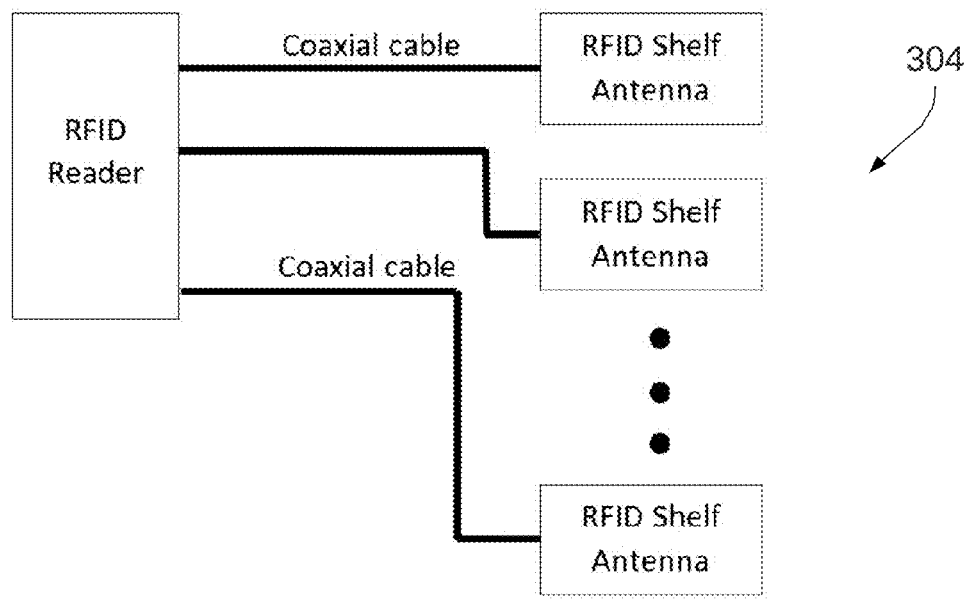
FIG. 3B illustrates an RFID reader and RFID shelf antennas in a parallel arrangement.

FIG. 2 shows a container 200, like a cabinet or a fridge, in which the antenna system 100 of FIG. 1 is used. In this non-limiting embodiment the container 200 has two shelves 202 and each shelf has an antenna arrangement 204 associated therewith. Each antenna arrangement 204 includes one or more antenna coils 104 and a control unit 206 that manages operation of the antenna coils 104 and that provides an interface between an RFID reader 208 and the antenna arrangement 204. In the embodiment illustrated in FIG. 2, the RFID reader 208 is in communication with the antenna arrangements 204 via a cable 102, shown here in a daisy chain arrangement 302 (as illustrated in FIG. 3A), but it will be understood that various configurations may be used such as a parallel arrangement 304 (as illustrated in FIG. 3B). The cable 102 may be, for example, a coaxial cable.

A combined RF, DC and control signal is transmitted from the RFID reader 208 to the antenna arrangements 204 in the container 200 via the cable 102. The DC power signal provides power to the antenna arrangements 204. The RF signal provides RFID tag interrogation data for an activated antenna. The control signal instructs the selection and activation of an antenna coil 104. In some embodiments the control signal may be imposed on the DC signal. In other embodiments the control signal maybe incorporated in the RF signal.

The control units 206 each include various electronics modules that implement various functions required to manage operation of the plurality of antenna coils. These electronics modules include a selection circuit 106, a processor 108, and a data transceiver 110.

The selection circuit 106 receives a control signal from the processor 108 with respect to the selection of a particular antenna coil 104 to activate for reading RFID tags on one of the shelves 202. The selection circuit 106 is typically in communication with the plurality of antennas 104 associated with the selection circuit 106 (in this embodiment the antennas 104 on a particular shelf 202) via a multiplexer. The RFID tags may be passive or active tags affixed to items placed on the shelves 202, and are typically used to identify and/or inventorise the items. The selection circuit 106 includes a tuner that adjusts the resonant frequency of the antenna coils by adjusting the tuning capacitances such that a selected and activated antenna coil is tuned to be resonant. In some embodiments, more than one coil may be activated at once, for example the coils on one shelf.

The processor 108 (for example in the form of a microcontroller) directs the operation of the selection circuit 106 and the tuner in order to activate a selected antenna coil 104. The processor 108 performs this direction based on a received control signal, and executes the direction in a predefined manner as determined by software commands stored on the processor 108 in the form of firmware.

The data transceiver 110 provides not only a communication interface between the RFID reader 208 and the RFID antenna system 100 for the received RF signal and the received control signals, but also a bidirectional communication link between the processor 108 and the RFID reader 208. The data transceiver 110 includes an pre-processing network 112, a communication module 114, and a codec 116.

The pre-processing network 112 is provided at the input of the RFID antenna system 100. In the exemplary embodiment, the pre-processing network 112 is an attenuation and filtering network, however in alternative embodiments it is envisioned that other types of signal pre-processing may additionally or alternatively be performed by the pre-processing network 112. The pre-processing network 112 is configured to attenuate the 13.56 MHz RF signal provided by the RFID reader 208 (which is typically greater than 10V RMS) to a smaller amplitude signal (typically 1V RMS) that can be safely provided at the semiconductor input to the communication module 114. The pre-processing network 112 acts as a DC block to prevent any DC voltages from being applied to the communication module 114, as well as acts as a filter to attenuate any harmonic currents generated by circuitry in the communication module 114. If the harmonic currents were allowed to reach the antenna, the radiation of these harmonic frequencies would be substantially higher than the allowable limit, hence rendering the antenna system to be non-compliant to the global emission requirements (such as the FCC in the USA, the RE Directive in Europe, emission ASNZS4268 standard requirement in Oceania and Radio Law in Japan).

Figure 4:
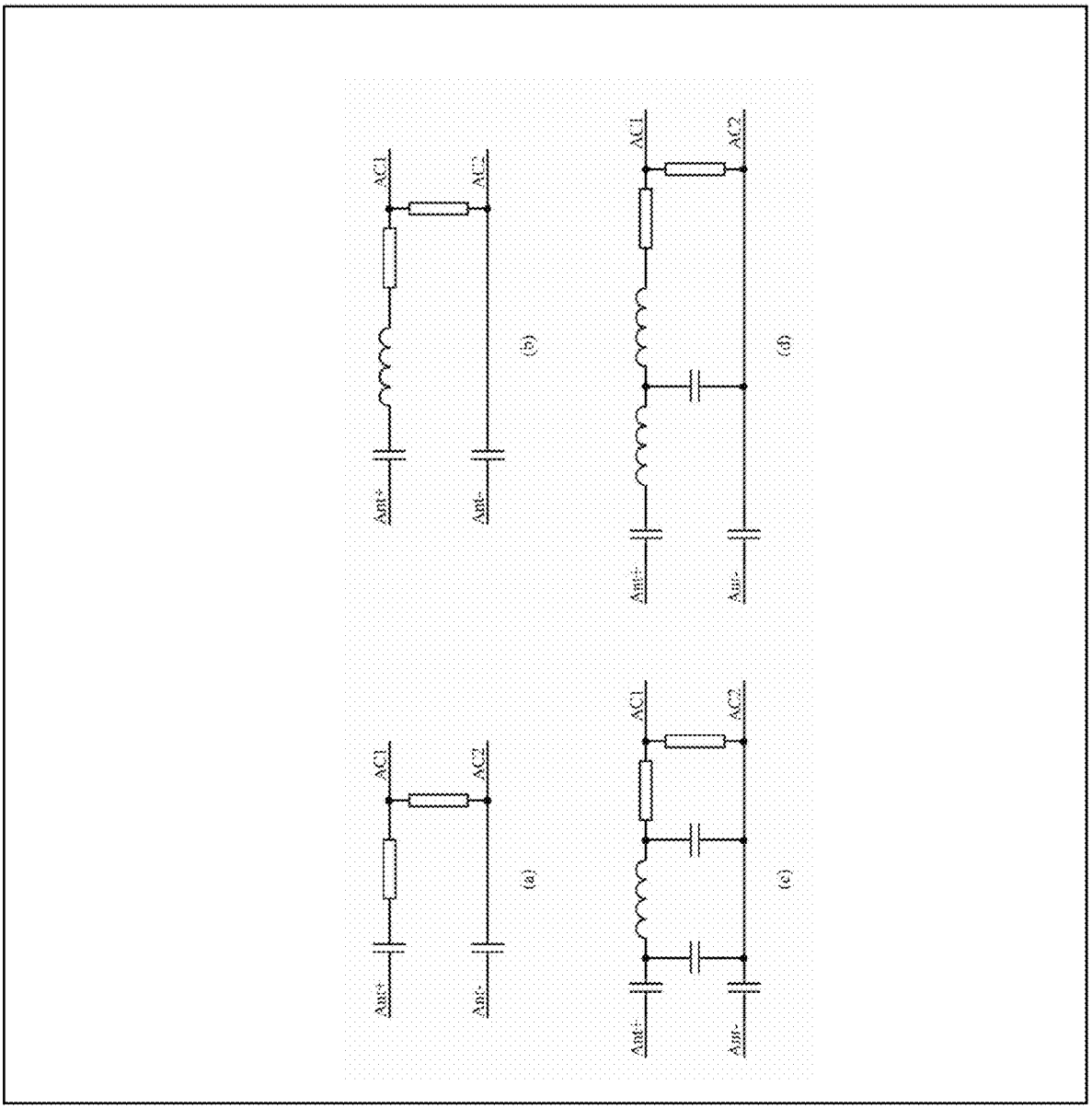
FIG. 4 shows four examples of attenuation networks.

The pre-processing network 112 includes a combination of resistors, capacitors and inductors with examples shown in FIG. 4: Ant+ and Ant− are the input to the RFID antenna system 100 via the coaxial cable, and AC1 and AC2 are the input to the communication module 114. The output of the pre-processing network 112 is an attenuated RF signal which is an attenuated and filtered version of the RF signal received from the RF reader 208.

In some embodiments the RF voltage used to drive the antenna coils may have a peak voltage of around 30V AC. If this voltage is directly connected to the input terminals of the communication module 114, then this will cause damage (as the semiconductor chip(s) used in the communication module typically has a maximum input peak voltage of 3.2V). The pre-processing network 112 reduces the voltage across the input terminals to around 1V peak so that it is within the recommended conditions for the chip(s).

Figure 5A:
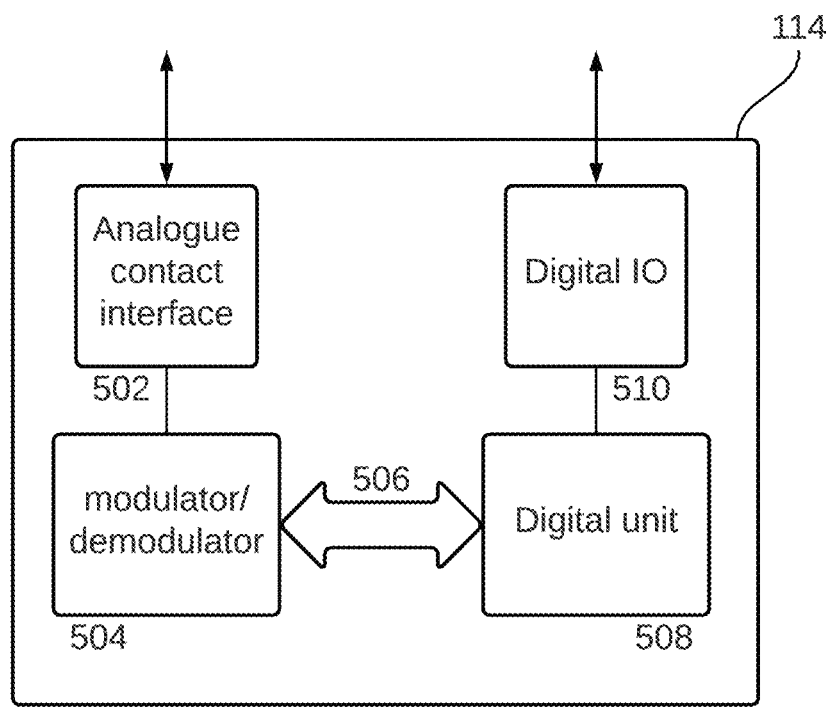
FIG. 5A is a block diagram of an embodiment of a communication module.

A block diagram of the communication module 114 is shown in FIG. 5A. The communication module 114 includes an analogue contact interface 502 configured to receive the attenuated RF signal from the pre-processing network 112. The analogue contact interface 502 is also configured to output RF signals to the RF reader 208 via the pre-processing network 112 and the cable 102.

The communication module 114 includes a modulator/demodulator 504 that demodulates received RF signals before providing them to the digital unit 508, and modulates signals received from the digital unit 508 before providing them to the analogue contact interface 502 to be sent back to the RFID reader 208.

The communication module 114 includes the function of an analogue to digital converter 506 thereby interfacing between the analogue RF signals that are sent from and received at the data transceiver 110, and the digital unit 508 of the communication module 114.

The communication module 114 includes a digital IO 510 that provides a digital interface between the communication module 114 and the processor 108, in this embodiment via a codec 116 which performs an encoding/decoding function as described in more detail elsewhere herein. In other embodiments, the RFID antenna system 100 does not include a separate codec 116 as shown in FIG. 1, and the communication module 114 interfaces directly with the processor 108.

The function of the digital unit 508 is to set the digital IO 510 to an open-drain output and output the received encoded digital command to the codec unit 116. When sending reply data upstream to the RFID reader 208, the digital unit 508 sets the digital IO 510 to an open-drain input, ready to accept encoded reply digital data from the codec unit 116.

In an exemplary embodiment, the communication module 114 is an RF module in the form of an RFID chip, for example a Pulse Jitter Modulation (PJM) RFID chip that is adapted to have an analogue contact (AC) interface and an input/output (IO) digital interface. The AC interface acts as an RF interface.

Figure 5B:
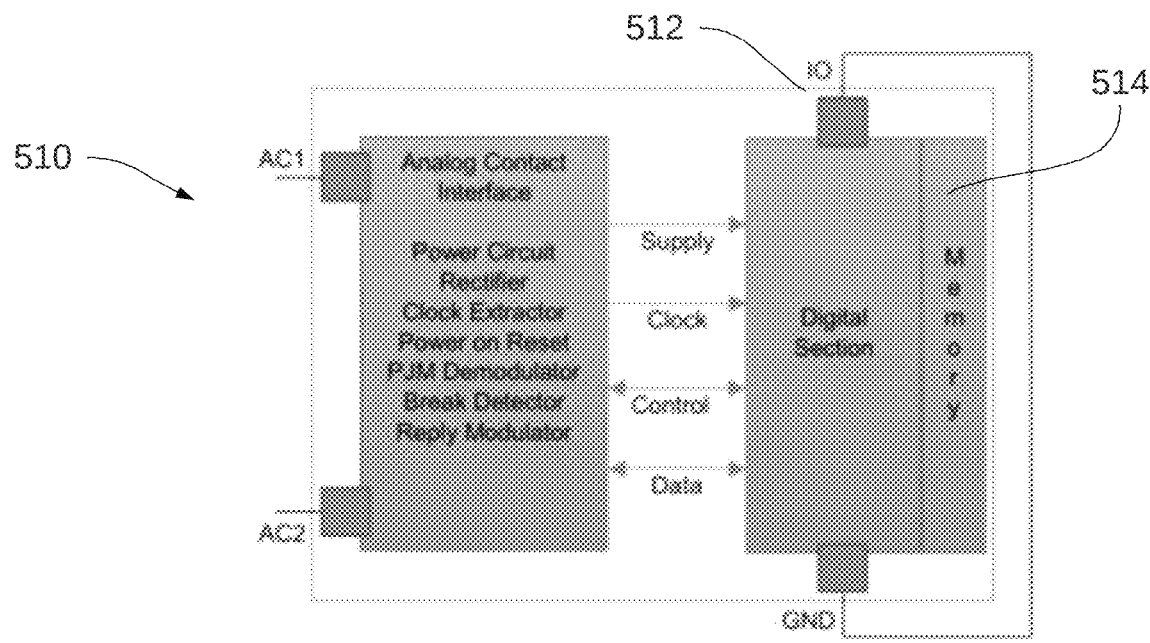
FIG. 5B is block diagram of an embodiment of a PJM RFID chip.

In this embodiment, the PJM RFID chip is a 13.56 MHz RFID chip compliant to and an enhancement of ISO/IEC 18000-3 Mode 2. The chip has been especially designed to identify closely stacked items. High speed data rates, eight reply channels, optimised command set and optimised anti-collision allow for quick identification of large populations and high speed reads of tag data. A block diagram of the structure of the PJM RFID chip 510 is shown in FIG. 5B.

In the RFID antenna system 100, the PJM RFID chip 510 is connected (via the pre-processing network 112) to the RF signal from the RFID reader 208. Hence, in this embodiment the RFID antenna system 100 relies only on electrical coupling to both power the PJM RFID chip 510 and transfer commands and replies between the RFID reader 208 and PJM RFID chip 510. In alternative embodiments, the PJM RFID chip 510 may be configured to receive power and/or data via magnetic coupling where an additional antenna (associated with the PJM RFID chip) is provided for this purpose.

The PJM chip 510 has an Input/Output (IO) pin 512 that can be controlled by commands sent from the RFID reader 208. If the commands are valid, the chip can set the IO pin 512 high or low, read the state at the IO pin 512 (high or low), and/or communicate to a device via the IO pin 512.

Commands can also be sent to the PJM RFID chip 510 via the IO pin 512. Thus, the processor 108 (e.g., a microcontroller) can read from and write to the PJM RFID chip 510 and also communicate to the RFID reader 208. This allows for a bi-directional communication link between the RFID reader 208 and the processor 108 using the PJM RFID chip 510.

When the RFID reader 208 sends a command to the processor 108, the command data on the IO pin 512 is Modified Frequency Modulated (MFM) or 1 out of 4 encoded. Similarly, when the processor 108 sends a reply to the RFID reader 208, the data sent to the PJM RFID chip 510 is MFM or 1 out of 4 encoded.

Advantageously, MFM encoding as used in this example embodiment is the same encoding used in the RFID tag reply, hence the same reader receiver decoder is reused to decode the reply from the processor 108. The advantage is that no additional different decoder is required.

In alternative embodiments however, the reply from the processor 108 back to the RFID reader 208 need not be MFM or 1 out of 4 encoding, but may be another form of suitable encoding.

A codec 116, also referred to as an encoder/decoder or sometimes an endec, is provided in the form of a logic circuit. In an exemplary embodiment, the codec 116 is in the form of a field-programmable gate array (FPGA), and is used to perform the decoding/encoding of the MFM signal, as well as to provide a serial communication link 120 with the processor 108, e.g. in the form of a Serial Peripheral Interface (SPI), or a universal asynchronous receiver-transmitter (UART). In other embodiments, the functionality of the codec (i.e., encoding/decoding) may be performed by a processor, for example the processor 108.

Firmware Updates

Using the communication module 114, for example in the form of a PJM RFID chip, allows for the remote and rapid updating and checking of the processor 108 firmware without the need for direct physical access. Using the communication link 120, and a custom bootloader (described in more detail elsewhere herein) on the processor 108, the firmware on the processor 108 can be updated remotely without the need to physically access the processor 108. Accordingly, the processor 108 is configured to input a received signal from the RFID reader via the communication module 114, extract operating data from the received signal, and load or update firmware on the processor 108 based on the extracted operating data.

Shelf antennas in certain application (e.g., medical fridges) are required to be fully sealed to prevent contamination of blood products placed on the shelf. This also prevents ingress of cleaning products or blood products into the shelf antenna in the event of spillage. This sealing may be achieved using gaskets, silicone based compounds, or by welding.

The processor 108 (e.g. in the form of a microcontroller) on-board the shelf antenna is typically programmed with firmware during production. The firmware provides operating data that defines the manner in which the processor 108 directs the operation of the selection circuit 106 and the tuner in order to activate a selected antenna coil 104. The processor 108 performs this direction based on a received control signal, and executes the direction in a predefined manner as determined by software commands stored on the processor 108 in the form of firmware. This firmware may however need to be updated in the field to either add new functionality or to fix problems (e.g., "bugs").

The RFID antenna system 100 allows the firmware to be remotely updated without the need to compromise or damage the seal. This update process is quick and can be automated easily to update several shelf antennas, reducing overall system down time. Accordingly, the problem solved is to remotely and rapidly update the software embedded in these sealed shelf antennas. The same can be applied to other remote devices connected to an RFID reader, for example for RFID shelving used in cool rooms or freezer rooms. For example, large cool room open shelving racking systems typically consist of 7 to 10 open shelving units, having a total of up to 70 individual shelf antennas. Typical freezer rooms for blood (for example) run between −35 and −40 degrees Celsius, making it a harsh environment for a human to work in for any extended period of time. The ability to remotely update the antenna embedded software without having to work in such a harsh environment is very beneficial.

The RFID antenna system described herein uses features in the PJM protocol to selectively communicate with the RFID tags as well as with the antenna digital controller (i.e., the processor). The selective communication is facilitated by the PJM RFID chip interface which implements a Group ID parameter. The Group ID for the processor is programmed to hexadecimal value 0xfffe (for example) whereas the RFID tags that are present on the shelves have Group ID's programmed to any values other than 0xfffe. The reader can communicate to the antenna digital controller ONLY by sending specific GroupID commands, in this case 0xfffe). On the other hand, if the reader wants to communicate to nominal RFID tags, it will send commands addressing that specific GroupID.

The processor 108 has a custom bootloader that is capable of rewriting the firmware, and provides for fail safe operation in the event of a failure in the firmware update process. In some embodiments the processor 108 includes one or more memory buffers where multiple copies of the firmware are stored in separate locations in non-volatile memory 514. This adds a layer of protection so that there is always a "safe" or working copy of the firmware available for the processor 108 to use in the event of a failure in the update process.

The processor 108 controls the antenna coils 104 based on commands received from the RFID reader 208. The commands may include selecting required switching (e.g. relays or PIC diodes) to either select antenna coils, or vary tuning parameters, as required.

The processor 108 executes a program (also referred to as its firmware) that is stored in its non-volatile FLASH memory. The firmware consists of machine code instructions that perform specific actions in the processor 108. A few lines (or records) of example firmware in the Intel Hex format (.hex) is shown below.

:100000000C9434000C9451000C9451000C94510049
:100010000C9451000C9451000C9451000C9451001C
:100020000C9451000C9451000C9451000C9451000C
:100030000C9451000C9451000C9451000C945100FC
:100040000C9451000C94CA010C9451000C94510072

Deconstructing the first line as an example gives:

TABLE 1

| : | 10 | 0000 | 00 | 0C9434000C9451000C9451000C945100 | 49 |
|---|---|---|---|---|---|
| Start code | Byte count (i.e. 0x10) | Address in Flash | Record type (i.e. data) | Data in Flash | Checksum of the record i.e. 0x49 |

In practice, it would be beneficial to be able to remotely update or change the firmware. This would allow for more functionality to be incorporated at a later stage, and would also allow for easy bug fixes. In the case of processors in enclosed or sealed shelf antennas, remote firmware upgrades mean that there would be no need to reopen the antennas for an upgrade. A way for such a remote firmware upgrade to be performed is described here:

In an example embodiment, the processor 108 (e.g. in the form of a microcontroller) has FLASH memory that is mapped to include an application code section and a bootloader section.

Application code section: This section typically starts at address 0x0000 in the FLASH. It contains the instructions to control the antenna as discussed above.

Bootloader section: This section typically starts at a different address in the FLASH. This section contains the bootloader program that can change or rewrite the instructions stored in the application section. The bootloader section can be locked so that it cannot be overwritten later. This acts as a fail-safe so that the microcontroller will always have a defined and uncorrupted program to execute. If the bootloader section is unlocked, then the bootloader program can update its own section. If this is the case, then there needs to be multiple copies of the application section (so that the microcontroller always has a valid program to execute).

Typically the memory is organised into pages containing a defined number of words specific to the microcontroller. And typically the microcontroller is only able to read and write to the FLASH one page at a time.

Depending on the protocol used to send data from the RFID reader 208 to the processor 108, the maximum number of bytes in a single packet may be less than the number of bytes in a page. If this is the case, then multiple data packets will need to be sent sequentially to form a single page. In such implementations, the processor 108 receives the packets and assembles a page of data to program into FLASH.

Figure 6:
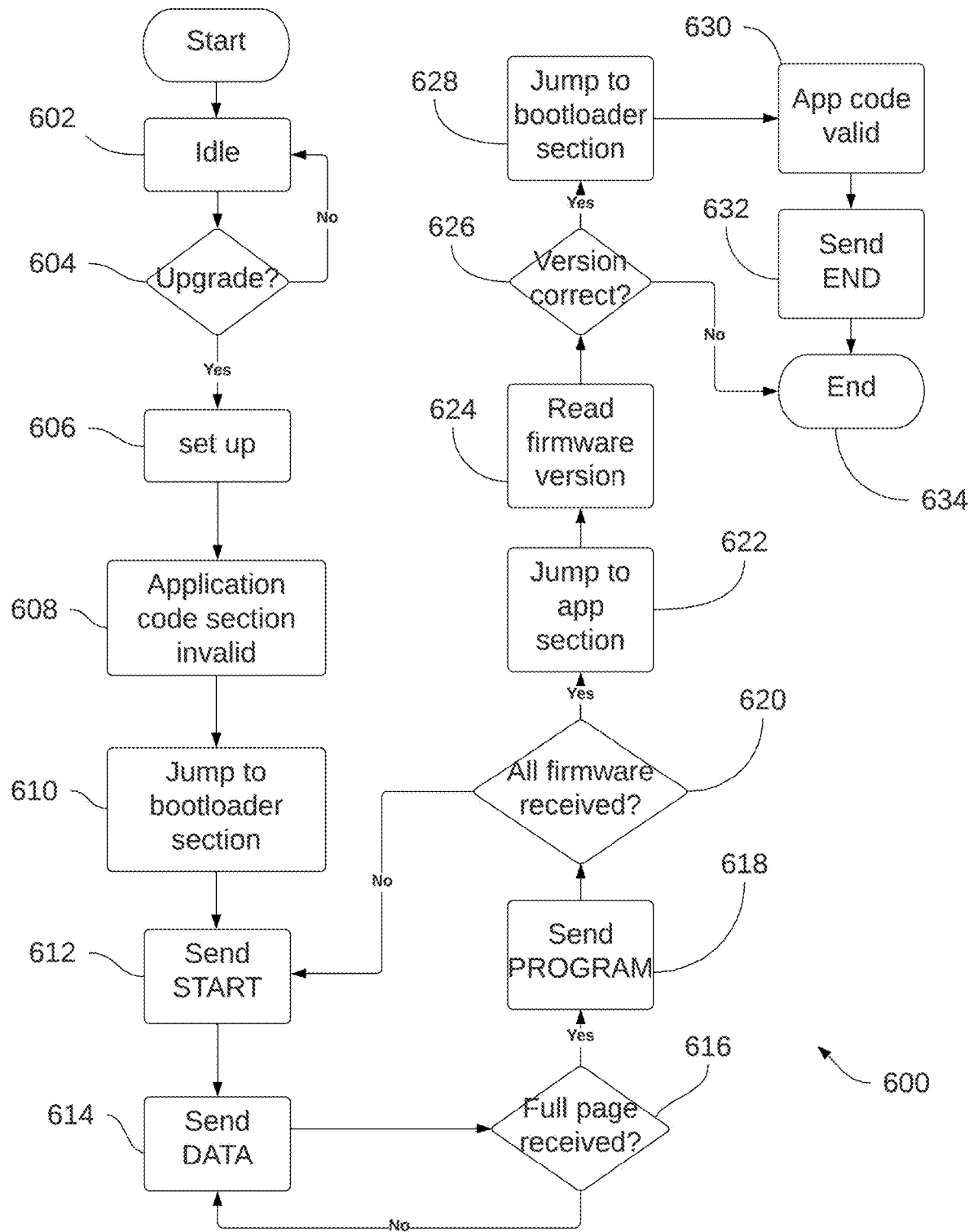
FIG. 6 shows a flow diagram of a firmware upgrade process according to an example embodiment.

FIG. 6 is a flowchart that illustrates a firmware upgrade process 600. During communication, commands sent from the RFID reader 208 to the processor 108 will receive a reply from the processor 108. This could either be a data packet, an acknowledgement (ACK) if the command was received correctly, or not acknowledge (NAK) if the command was not received correctly. If a packet failed to be received, then the RFID reader 208 will retry by sending the command again. This is one of the reasons why bi-directional communication between the RFID reader 208 and the processor 108 is important for firmware upgrades to work properly.

In summary, the firmware is updated by the RFID antenna system by receiving, at the data transceiver 110 of the RFID antenna system 100, a signal from the RFID reader 208; extracting, at the processor 108 of the RFID antenna system 100, operating data from the received signal; and updating firmware on the processor 108 based on the extracted operating data. The signal received from the RFID reader 208 includes a number of different commands as described below with reference to FIG. 6.

At 602 the processor 108 is in its default idle state, i.e. it is running code located in the application section, and it is not processing any commands from the RFID reader 208.

At 604, a firmware upgrade is initiated when, at 606, the RFID reader 208 sends a command via the RF coaxial cable to set the communication module 114 (in this example embodiment being a PJM chip) to IO bridge mode. This causes the PJM chip to send all commands that it receives to the IO pin. As the PJM chip will have a different GroupID of 0xfffd, the RFID reader can use the unique GroupID address to communicate with only the PJM chip while any other RFID tags will ignore this command. The codec 116 is connected to this IO pin. The codec 116 performs the decoding/encoding of the signal (in this example an MFM signal) and provides a serial communication link with the processor 108. Using this communication module 114 and the codec 116, commands and data required for the firmware upgrade can be sent between the reader and the processor.

At 608, the RFID reader 208 sends a command that will mark the application code as invalid. This command also contains the password for this action to be carried out, in order to avoid accidentally marking the application as invalid. The processor 108 stores the application code validity byte in its non-volatile EEPROM (e.g. 0 is invalid, 1 is valid), and when it receives this command, it sets/clears this byte accordingly. This ensures that if the firmware upload fails midway, then the processor 108 can know that the application is invalid or corrupted, and will execute code in the bootloader section instead when it reboots. Furthermore, when the application is marked as invalid, the processor 108 will automatically erase or reinitialise the contents of FLASH memory so that the new contents can be written.

At 610, the RFID reader 208 sends a command to tell the processor 108 to switch over or jump to the bootloader section of code and start executing instructions.

At 612, the RFID reader 208 sends a START command. This START command contains the number of data packets that will be sent to make up one page of FLASH in the processor 108. The command also contains the page number in FLASH that is to be programmed.

At 614, the RFID reader 208 sends a DATA command. This command contains a portion of the data to be programmed to a page in FLASH. As mentioned, a page is sent in multiple packets, and the processor 108 receives these packets and assembles them into a page of data.

At 616, the RFID reader 208 keeps sending DATA commands until the whole page of data is received by the processor 108. In this way, the command signals from the RFID reader are all received by the processor 108.

At 618, the RFID reader 208 sends a PROGRAM command. This tells the processor 108 to program the full page of data to FLASH. The command also contains a CRC (cyclic redundancy check) number of the data to be programmed. Before programming the data, the processor 108 checks the CRC of the data it received with the CRC that it was sent. If the two numbers match, then it will program the FLASH. This adds another layer of error checking to prevent writing incorrect data to FLASH.

At decision 620, the START, DATA and PROGRAM commands continue until the whole firmware file has been sent.

At 622, the RFID reader 208 sends a command to tell the processor 108 to jump to the application section of FLASH.

At 624, the RFID reader 208 reads the application firmware version in non-volatile EEPROM. If, following decision step 626, the firmware version received matches the firmware version sent, then the process is marked as a success.

With steps 618 to 624 the processor 108 extracts the operating data from the received signal and loads the firmware on the processor 108 based on the extracted operating data.

If the programming was unsuccessful, then the program will exit at 634. The RFID reader 208 can then retry a firmware upgrade if required.

If the programming was a success, then at 628, the RFID reader 208 tells the processor 108 to jump to the bootloader section of the FLASH, and at 630 the RFID reader 280 sends a command to mark the application as valid.

If successful, then at 632 the RFID reader 208 sends the END command. This causes the processor 108 to reset itself. The processor 108 will now boot into the application section and start executing commands.

This is the end of the firmware upgrade process.

Advantageously, firmware updates are enabled because the bidirectional communication allows for acknowledgement signals to be returned to the RFID reader from the RFID antenna system. The bi-directional communication allows the processor (in the sealed antenna system) to acknowledge packets received from the RFID reader. If a packet is received correctly and acted upon, then the RFID reader can send the next packet. On the other hand, if a data packet is corrupted on reception, then the processor can let the RFID reader know this so that the RFID reader can resend this packet until it is received properly.

Furthermore, using the PJM RFID chip for the communication module 114 allows for a higher data rate than would otherwise be possibly, which makes the transmission of large amounts of data for firmware updates practical. In one exemplary embodiment, it has been shown that a program containing 4083 bytes takes around 20 seconds to be uploaded to the microcontroller (i.e., the processor). This represents a data rate of approximately 1633 bit/s. The PJM RFID interface is communicating at a higher data rate (between 106 kbit/s and 424 kbit/s), however there is some overhead when sending packets to the PJM RFID chip (e.g. addressing the chip, specifying the command, and CRC checks).

Advantageously, in addition to the firmware updates that are enabled by the bidirectional communication, more extensive diagnostics are also possible because of the more sophisticated and wider bandwidth communication (compared to prior art systems where, for example, limited diagnostic feedback can be sent back to the RFID reader).

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A radio frequency identification, RFID, antenna system adapted to receive and implement firmware programming from an RFID reader, the RFID antenna system comprising:
   a plurality of antenna coils for reading RFID tags;
   a selection circuit configured to activate an active antenna coil from the plurality of antenna coils;
   a processor configured to control operation of the selection circuit; and
   a data transceiver configured to provide bidirectional data communication between the processor and the RFID reader so that the RFID antenna system receives and implements firmware programming from the RFID reader,
   wherein the data transceiver comprises a communication module comprising a radio frequency (RF) module, and
   wherein the RF module comprises a Pulse Jitter Modulation RFID chip adapted to have:
   an analogue contact interface in communication with the RFID reader; and
   an input/output interface in communication with the processor.

2. The RFID antenna system of claim 1, wherein the data transceiver further comprises a pre-processing network, and a codec.

3. The RFID antenna system of claim 1, wherein the processor is configured to:
   input a received signal from the RFID reader via the data transceiver;
   extract operating data from the received signal; and
   load firmware on the processor based on the extracted operating data.

4. A method of updating firmware of an RFID system, the method comprising:
   at a data transceiver of the RFID system comprising a communication module with a radio frequency module and a Pulse Jitter Modulation RFID chip, receiving a signal from an RFID reader;

extracting, at a processor of the RFID system, operating data from the received signal; and updating firmware on the processor based on the extracted operating data.

* * * * *